United States Patent [19]

Carlson

[11] 3,775,555

[45] Nov. 27, 1973

[54] MODULATOR SYSTEM

[75] Inventor: David John Carlson, Indianapolis, Ind.

[73] Assignee: RCA Corporation, New York, N.Y.

[22] Filed: Aug. 31, 1972

[21] Appl. No.: 285,234

[52] U.S. Cl. ......... 178/6.8, 178/5.4 CR, 178/6.6 A, 325/136, 325/171

[51] Int. Cl. ........ H04n 5/78, H04n 5/40, H04b 1/68

[58] Field of Search ................ 178/DIG. 1, DIG. 13, 178/6.8, 7.1, 7.2, 7.3 R, 6.8 A, 6.6 R; 325/308, 171, 172, 174, 331; 332/44, 45

[56] References Cited

UNITED STATES PATENTS

| | | | |
|---|---|---|---|
| 2,994,765 | 8/1961 | Adam | 325/171 |
| 3,573,350 | 4/1971 | Rhee | 178/5.4 CD |

*Primary Examiner*—Robert L. Griffin
*Assistant Examiner*—John C. Martin
*Attorney*—Eugene M. Whitacre et al.

[57] ABSTRACT

A video playback system incorporates a modulator system to enable direct connection to a television receiver antenna terminals. The modulator system includes a tunable source of radio frequency carrier signals. Each of the frequencies to which the source is tunable is selected to be of a frequency to which a television receiver tuner is tunable. Double sideband modulated output signals from the modulator are applied to a tunable attenuator filter. The filter is tunable to a plurality of frequencies and tracks the tuning of the source of radio frequency carrier signals. The tunable attenuator filter attenuates the lower sideband signal information of the output signals from the modulator to provide vestigal sideband modulated radio frequency output signals.

9 Claims, 1 Drawing Figure

PATENTED NOV 27 1973
3,775,555
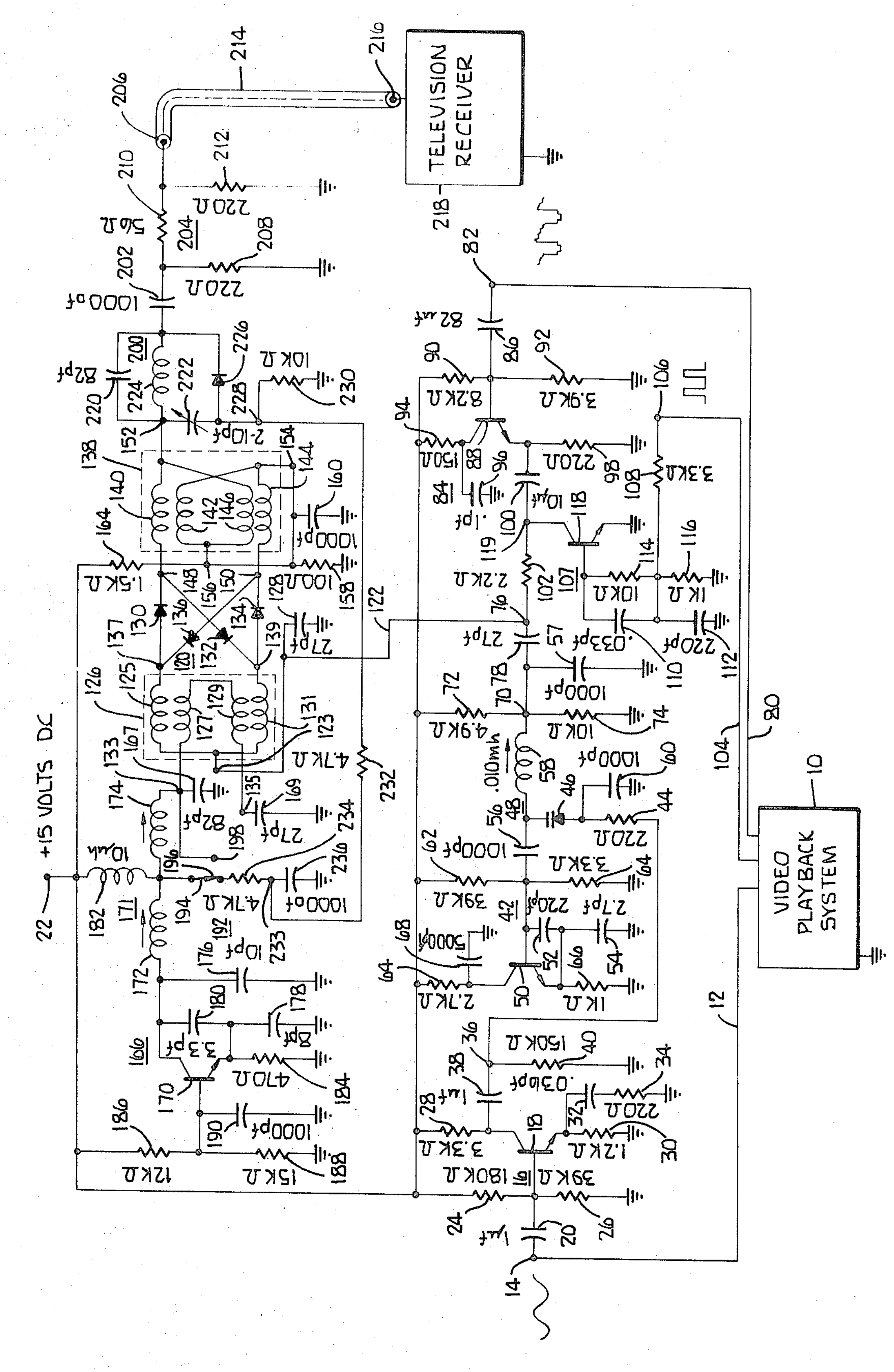

MODULATOR SYSTEM

The present invention pertains to modulator systems and more particularly to a modulator system suitable for modulating a radio frequency carrier signal with television signal information.

Video playback systems have been proposed for home use, such as magnetic video tape players and video disc players. A video disc playback system suitable for home use is shown in U.S. Pat. application Ser. No. 126,678, filed Mar. 22, 1971, for Thomas Osborne Stanley and entitled, "HIGH-DENSITY INFORMATION RECORDS AND PLAYBACK APPARATUS THEREFOR," and U.S. Pat. application Ser. No. 126,772, filed Mar. 22, 1971, for Jon Kaufman Clemens and entitled, "INFORMATION RECORDS AND RECORDING/PLAYBACK SYSTEMS THEREFOR." Both applications are assigned to RCA Corporation.

It is particularly desirable with video playback systems of the above described type to be able to couple the video playback unit to the antenna terminals of a television receiver. To do this, however, requires that the video playback system simulate the transmission of television broadcast stations. The standards for such transmission are established by the Federal Communications Commission and are set forth in a textbook by McIllwain and Dean entitled, "Principles of Color Television," published by John Wiley and Sons, Inc., Copyright 1956.

Due to frequency allocations by the Federal Communications Commission, the particular unused television channels within the television frequency band vary from locale to locale. It is therefore desirable that the user be able to adjust the frequency of the video playback unit output signals to one of the non-used television channels in his locale. This avoids possible interaction between the video playback unit output signals and locally generated television signals. Moreover, it is desirable that frequency selection be simple to effectuate and require a minimum of user adjustments.

A modulator system embodying the present invention includes a source of video information signals and a source of radio frequency carrier signals. The source of radio frequency carrier signals is tunable to a plurality of different frequencies. Each of the plurality of frequencies is selected to be within a different television channel to which a television receiver may be tuned. A modulator is coupled to the source of radio frequency carrier signals and has an input terminal and an output terminal. Means are connected between the source of video information signals and the modulator input terminal for coupling the video information signals to the modulator input terminal such that double sideband modulated radio frequency carrier signals are developed at the modulator output terminal. A tunable attenuator filter is coupled between the modulator output terminal and another terminal. The filter is tunable to a plurality of frequencies, each frequency of the plurality of frequencies having a fixed relationship to a corresponding frequency of the plurality of frequencies to which the source of radio frequency carrier signals is tunable. Control means are coupled to the source of radio frequency carrier signals and the attenuator filter for controlling the tuning of both the source of radio frequency carrier signals and the attenuator filter. The control is such that the tuning of the attenuator filter tracks the tuning of the source of radio frequency carrier signals to develop vestigial sideband modulated radio frequency carrier signals at the other terminal.

A complete understanding of the present invention may be obtained from the following detailed description of a specific embodiment thereof, when taken in conjunction with the accompanying drawing, in which the single FIGURE is a schematic circuit diagram, partly in block form, of a video playback system including a modulator system embodying the present invention.

Reference is now made to the drawing. A video playback system 10 is adapted to recover color television signal information recorded on a record medium. The record medium, not shown, may be a magnetic tape or a video disc. The audio signal portion of the recorded information is applied via a lead 12 to input terminal 14 of an amplifier stage 16. The waveform of the audio signal portion of the recorded information is shown adjacent terminal 14. The amplifier stage 16 includes a transistor 18. The audio signal at the terminal 14 is coupled to the base electrode of the transistor 18 by a capacitor 20. Base bias for the base electrode of the transistor 18 is obtained from a source of operating potential applied to a terminal 22 through the voltage divider resistors 24 and 26. The collector electrode of the transistor 18 is connected by a resistor 28 to the source of operating potential at the terminal 22. The emitter electrode of the transistor 18 is connected to ground by a resistor 30 and the series connected capacitor 32 and resistor 34.

Amplified audio signals developed at the junction 36 of a capacitor 38 and resistor 40 are coupled to a frequency modulator stage 42 by a resistor 44. The frequency modulator stage functions to frequency modulate a 4.5 MHz carrier signal with the audio information. The amplified audio signals are applied through resistor 44 to the anode of a voltage controlled variable capacitance diode 46. The voltage controlled variable capacitance diode 46 is connected in 4.5 MHz center frequency tuned circuit 48 of a transistor oscillator. The base electrode of the oscillator transistor 50 is connected to the tuned circuit which includes the capacitors 52, 54, 56 and 57, an inductor 58, and the variable capacitance diode 46. The anode electrode of the variable capacitance diode 46 is connected to ground for AC signals by a capacitor 60.

Operating potential for the base electrode of the oscillator transistor 50 is obtained from the source of operating potential applied to the terminal 22 through the voltage divider resistors 62 and 64. The collector electrode of the oscillator transistor 50 is connected to the source of operating potential at the terminal 22 by a resistor 64, and the emitter electrode of the transistor is connected to ground by a resistor 66. The collector electrode of the oscillator transistor 50 is bypassed to ground for AC signals by a capacitor 68. It will be recognized that the oscillator is a grounded collector Colpitts type oscillator with capacitors 52 and 54 providing the requisite feedback signal.

Reverse bias for the voltage controlled variable capacitance diode 46 is obtained via inductor 58 from the junction 70 of resistors 72 and 74 connected between the source of operating potential at the terminal 22 and ground. Amplified audio signals applied to the anode of the variable capacitance diode 46 change the magnitude of the reverse bias across the diode. This causes the variable capacitance diode to exhibit a varying capacitance. For the component values shown, where the voltage at the junction 36 varies between −1 and +1 volts, the frequency of the tuned circuit 48 will vary ±25 KHz around a center frequency of 4.5 MHz. The frequency modulated 4.5 MHz signal is coupled through a DC blocking capacitor to a junction 76.

The video signal portion of the recorded information, including the chrominance signal information, is applied via a lead 80 to terminal 82 of a buffer amplifier stage 84. The waveform of the video signal portion of the recorded information is shown adjacent the terminal 82. The video signal at the terminal 82 is coupled by a capacitor 86 to the base electrode of transistor 88. Voltage divider resistors 90 and 92, connected between the source of operating potential at the terminal 22 and ground, apply a bias to the base electrode of transistor 88. The collector electrode of the transistor 88 is connected to the source of operating potential at the terminal 22 by a resistor 94. A filter capacitor 96 is connected between the collector electrode of the transistor 88 and ground. The emitter electrode of the transistor 88 is returned to ground by a resistor 98. Output signals from the transistor 88 are applied to the junction by the series connected capacitor 100 and resistor 102.

A train of pulses coinciding in time and duration with the horizontal sync pulse portion of the video signals applied to terminal 82 are obtained from the video playback system 10. The pulses are applied over a lead 104 to a terminal 106 of a DC restoration stage 107. The waveform of the pulses is shown adjacent terminal 106. The pulses at the terminal 106 are applied by a resistor 108 and a filter network including the capacitors 110 and 112 and the resistors 114 and 116 to the base electrode of a transistor 118. The pulses at the terminal 106 bias the transistor 118 into conduction causing the junction 119 of the capacitor 100 and resistor 102 to be connected to ground for the duration of each pulse. This causes capacitor 100 to discharge and additionally, as will be explained in greater detail hereinafter, establishes a maximum signal output level for a balanced ring modulator 120.

The voltage developed at the junction 76 is applied as a modulating signal via a lead 122 to a center tap terminal 123 of the secondary portion of a balun transformer 126. The balun transformer functions as a wide band transformer and is connected as part of the balanced modulator 120. The balun transformer 126 exhibits a 150 ohm characteristic impedance between adjacent conductors of a transmission line shown, respectively, as windings 125 and 127. Similarly, the balun transformer exhibits a characteristic impedance of 150 ohms betweeen the adjacent conductors of another transmission line shown, respectively, as windings 129 and 131. The balun transformer terminals are connected such that the balun exhibits a 300 ohm impedance between the balun terminals 133 and 135, the primary portion of the balun transformer, and a 300 ohm output impedance between the balun terminals 137 and 139, the secondary portion of the balun transformer. The center tap terminal 123 of the balun transformer secondary portion is connected to ground for the modulator carrier signal by a capacitor 128.

Diodes 130, 132, 134 and 136 are coupled to the balun transformer terminals 137 and 139 and are connected in a ring with all the diodes poled in the same direction. The diodes 130, 132, 134 and 136 are additionally connected to a balun transformer 138 which functions as the output transformer of the balanced modulator 120. The balun transformer 138 exhibits a 150 ohm characteristic impedance between adjacent conductors of a transmission line shown, respectively, as windings 140 and 142. Similarly, the balun exhibits a characteristic impedance of 150 ohms between the adjacent conductors of another transmission line shown, respectively, as windings 144 and 146. The balun terminals are connected such that the balun exhibits a 300 ohm input impedance between the balun input terminals 148 and 150 and a 75 ohm output impedance between the balun terminals 152 and 154.

The balun terminal 156 functions as a center tap for the input portion of the balun transformer 138. The balun terminals 154 and 156 are returned to ground for DC video and frequency modulated audio signals by a resistor 158. The terminals are additionally connected to ground for radio frequency signals by a capacitor 160. A DC offset bias is applied to the balanced modulator balun terminal 156 by the voltage divider resistors 158 and 164 connected between the source of operating potential at the terminal 22 and ground.

A radio frequency oscillator stage 166 provides a carrier signal which is modulated in the balanced modulator 120 by the voltage developed at the junction 76. The oscillator stage 166 includes an oscillator transistor 170 connected as a grounded base Colpitts type oscillator. The collector electrode of the oscillator transistor 170 is connected to a tunable resonant circuit 171 including the inductors 172 and 174, and the capacitors 176, 178, and 180. Capacitors 178 and 180 provide a feedback voltage between the collector and emitter electrodes of the oscillator transistor 170 for sustaining oscillation. The tunable resonant circuit is coupled to the primary portion of the balun transformer 126. Two capacitors 167 and 169 are respectively coupled to the balun terminals 133 and 135 to provide a proper input impedance and signal drive level for the primary portion of the balun transformer.

Operating potential for the collector electrode of the transistor 170 is obtained from the source of operating potential applied to the terminal 22 through a radio frequency choke 182 and inductor 172. The emitter electrode of the transistor 170 is returned to ground by a resistor 184. The voltage divider resistors 186 and 188 connected between the source of operating potential at the terminal 22 and ground provide base bias for the oscillator transistor 170. Capacitor 190 bypasses the base electrode of the transistor 170 to ground for radio frequency signals.

The radio frequency oscillator stage 166 is tunable to oscillate at either 55.25 MHz or 61.25 MHz depending upon the position of a switch 192. With switch contact 194 engaging switch contact terminal 196, as shown, the oscillator stage operates at 55.25 MHz. With switch contact 194 engaging switch contact terminal 198, inductor 174 is bypassed. Under these conditions, the oscillator stage 166 operates at 61.25 MHz. It will be noted that 55.25 MHz is the frequency assigned by the Federal Communications Commission to the luminance carrier signal for channel 2, and 61.25 MHz is the frequency assigned to the luminance carrier signal for channel 3.

With carrier signals applied to the primary portion of the balun transformer 126 and a modulating voltage applied from junction 76 to the center tap terminal 123 of the secondary portion of the balun transformer, double sideband modulated carrier signals are developed at the balun output terminal 152. These signals are applied to a tunable series attenuator filter 200. The attenuator filter 200 is connected by a DC blocking capacitor 202 and a 75 ohm $\pi$ type resistive attenuator 204 to the modulator system output terminal 206. The resistive attenuator 204 which includes the resistors 208, 210 and 212, provides proper impedance matching and signal drive level to a 75 ohm coaxial cable 214. The cable couples the modulator system output signals to the antenna terminals 216 of a television receiver 218. The tunable attenuator filter 200 attenuates the lower sideband signal information of the double sideband modulated carrier signals developed at the balun terminal 152. The attenuation modifies the double sideband signals to form vestigial sideband modulated carrier output signals at terminal 206.

The tunable attenuator filter includes the capacitors 220 and 222, the inductor 224, and the diode 226. The conduction condition of the diode 226 is determined by the position of switch contact 194. With switch contact 194 engaging switch contact terminal 196, a voltage develops at junction 228 of the voltage divider network including resistors 230, 232 and 234. The voltage biases the diode 226 into conduction. A capacitor 236 connected between junction 233 and ground prevents the carrier signals from being coupled to the tunable attenuator filter 200. The DC return path for the cathode of the diode 226 is through inductor 224, balun terminal 152, winding 146, balun terminal 156, and resistor 158. With diode 226 biased for conduction, capacitor 222 is connected in parallel with the capacitor 220 and the inductor 224. Under these conditions, the tunable attenuator filter 200 is tuned to a center frequency of approximately 51 MHz and functions to form vestigial sideband modulated carrier output signals at the terminal 206 with the oscillator stage 166 operating at 55.25 MHz.

When switch contact 194 engages switch contact terminal 198, diode 226 is reverse biased. The reverse bias is applied to the cathode of the diode 226 from the source of operating potential at the terminal 22 through the resistor 164, the balun terminal 156, the winding 146, the balun terminal 152, and inductor 224. The anode of the diode 226 is returned to ground by the resistor 230. Under these conditions, capacitor 222 is no longer connected in parallel with the capacitor 220 and the inductor 224, and the tunable attenuator filter 200 is tuned to a center frequency of approximately 57 MHz. The tunable attenuator filter 200 operates to form vestigial sideband modulated carrier output signals at terminal 206 with the oscillator stage 166 operating at 61.25 MHz.

If desired, switch 192 can be located with the tunable attenuator filter 200 and diode 226 can be located with the tunable resonant circuit 171 of the radio frequency oscillator stage 166. This positions the switch 192 in proximity to the television receiver 218. Moreover, the switch 192 can be replaced with a diode. Under this condition, a switch is coupled to both diodes and is positionable at a convenient location which may be remote from the modulator. The switch provides a mechanism for adjusting the bias condition of both diodes and thereby controls the tuning of the tunable resonant circuit 171 and tunable attenuator filter 200.

During operation of the modulator system, with only video signals coupled to junction 76, transistor 118 is biased into conduction during the horizontal sync portion of the video signals applied to terminal 82 and the maximum carrier signal amplitude is developed at the balun terminal 152. Conduction of transistor 118 establishes a maximum voltage differential between balun terminal 156 and the center tap terminal 123 of the secondary portion of the balun transformer 126. This modulating voltage causes a maximum imbalance between the diodes of the balanced modulator 120. The imbalance tends to forward bias diodes 132 and 136 and reverse bias diodes 130 and 134. Under this condition, the maximum carrier signal level is developed at the balun terminal 152.

When transistor 118 is no longer biased into conduction, the voltage at junction 119, and hence at junction 76, begins to rise due to the video signal voltage at the emitter electrode of transistor 88. The increased modulating signal voltage at junction 76 reduces the voltage differential between the balun terminal 156 and the center tap terminal 123. This reduces the carrier signal amplitude developed at the balun terminal 152 due to a reduction in the bias tending to forward bias diodes 132 and 136 and reverse bias diodes 130 and 134. The level of radio frequency carrier signal amplitude developed at the balun terminal 152 tracks the modulating voltage variations at the junction 76 and the balanced modulator provides double sideband modulated carrier output signals.

With only frequency modulated audio information signals coupled to the junction 76 and with no DC offset voltage applied to the balanced modulator (balun terminal 156 disconnected from the junction of resistors 158 and 164 to eliminate the DC voltage used to establish a maximum radio frequency carrier signal amplitude for synchronizing pulse portion of the video signals), the balanced modulator 120 develops upper and lower frequency modulated sideband signals at the balun terminal 152. The sideband signals are located 4.5 MHz above and below the frequency of the radio frequency carrier signals. The upper and lower sideband signals are of a constant amplitude because the modulating voltage at the junction 76, the frequency modulated audio information signals, has a constant amplitude. Because the modulator 120 is a balanced modulator and the DC offset voltage has been removed, the radio frequency carrier signals are suppressed, being nulled due to the balance of the modulator diodes.

With the DC offset voltage applied to the balun terminal 156 and both frequency modulated audio information signals and the amplitude modulated video signals coupled to the junction, the amplitude of the carrier signals at the balun terminal 152 tracks the combined modulating signal voltages. The instantaneous voltage at the junction 76 is the vectorial addition of the frequency modulated audio information signals and the amplitude modulated video signals. The amplitude of the radio frequency signals at the balun terminal 152 tracks the video modulating voltage at the junction 76, and contain upper and lower sidebands. The amplitude of the 4.5 MHz frequency modulated sideband signals at the balun terminal 152 track the constant amplitude frequency modulated audio information signals at junction 76 and are of constant amplitude. The voltage of the combined signals at the junction 76 can reach a level where the balanced modulator carrier signals become over modulated; that is, the modulation of the carrier signal exceeds 100 percent.

The amount of over modulation is determined in part by the video signals. For example, during a bright yellow scene, the chrominance information is encoded on a 3.58 MHz carrier signal of a particular phase representative of the color and with a significant peak to peak amplitude representative of the color saturation. Moreover, because the luminance information represents a light scene a high DC component will be present in the video signal. Under these conditions, with the frequency modulated audio signals present, the modulating voltage at junction 76 will reach a level where a greater amount of over modulation of the carrier signals occurs as compared with darker scenes with less saturated colors. For sufficiently dark scenes the modulating voltage at junction 76 will not reach the level where over modulation of the carrier signals occurs.

If the voltage at the center tap terminal 123 of the balun transformer 126 exceeds the voltage at the center tap terminal 156 of the balun transformer 138, the balanced modulator 120 continues to operate without clipping the carrier output signals developed at balun terminal 152. Thus, because modulator 120 is balanced, when the modulating signal voltage at junction 76 exceeds the voltage at the balun terminal 156 which represents a condition of over modulation, that is, a modulation exceeding 100 percent modulation of the carrier signals, the bias on the diodes of the balanced modulator 120 reverses. The modulating voltage at the junction 76, since it exceeds the voltage at the balun terminal 156, tends to forward bias the diodes 130 and 134 and reverse bias the diodes 132 and 136. Because bias on the diodes of the balanced modulator is reversed, the phase of the carrier signal developed at the balun terminal 152 reverses. Thus, even when the instantaneous modulating voltage at the junction 76 causes instantaneous over modulation of the carrier signals in the balanced modulator, the modulated carrier output signals are not distorted or clipped. The continued operation of the balanced modulator 120 without clipping or distortion of the modulated carrier signal at the balun terminal 152 during periods of over modulation avoids the introduction of non-linearity in the modulator system with its attendant effects in the television receiver 218.

When over modulation occurs, the modulated carrier signal is not an accurate representation of the video or audio information signals. This is because the amplitude of the modulated carrier signal begins to increase in amplitude when the modulating signal decreases in amplitude. During over modulation, the amplitude of the modulated carrier signal increases which represents darker scene content when the amplitude of the video signal is decreasing to represent a lighter scene. This effect, however, is not sufficient to degrade the picture reproduced by the television receiver to an extent that it becomes objectionable. The color information contained in the modulated carrier signal during over modulation also is not an accurate representation of the scene because of the amplitude inaccuracy and the reversal in phase of the carrier signal. Again, this effect is not sufficient to degrade the picture reproduced by the television receiver to an extent that it becomes objectionable.

It should be recognized that the synchronization of the television receiver color oscillator is controlled by the burst information located on the back porch of the video signal blanking pedestal. The blanking pedestal occurs in a blacker than black region and therefore is not located at a point where over modulation can occur. As a result, there is no distortion of the burst information contained in the modulated carrier signal. Thus, the television receiver color oscillator functions properly.

During over modulation, the audio signal remains undistorted. Since the modulated carrier signal is not clipped, the modulator does not operate in a non-linear mode. As a result, the 4.5 MHz frequency modulated audio signal is not distorted by modulation due to the video signal. Such distortion, should it occur, may create a "buzzing" noise in the audio channel due to portions of the video signal which fall within the audio frequency spectrum (mainly harmonics components of the vertical synchronizing information). Moreover, since the carrier signal is essentially always present (the exception being at exactly 100 percent modulation), the audio channel is never rendered inoperative due to a loss of the 4.5 MHz frequency modulated audio signal which is generated by the interaction of the luminance and audio carrier signals. As previously indicated, the 4.5 MHz frequency modulated audio signal is used in intercarrier type television sets for the sound channel.

The tunable attenuator filter 200 attenuates the lower sideband signals of the modulated carrier signals at the balun terminal 152. Thus, the 4.5 MHz frequency modulated lower sideband signal is attenuated and only one frequency modulated signal is present, the upper sideband signal. This signal is located 4.5 MHz above the radio frequency carrier. The tunable attenuator filter 200 also attenuates the lower sideband signals due to the amplitude modulation of the radio frequency carrier signals by the video signals. The attenuation results in a vestigial sideband carrier signal amplitude modulated by the video signals.

It will be recognized that the present modulator system simulates a two transmitter system such as is used by television stations. Specifically, the present modulating system simulates the use of a first transmitter for transmission of a radio frequency carrier signal frequency modulated by audio information signals and 4.5 MHz above the frequency of the video carrier signal, and a second transmitter for the vestigial sideband transmission of a radio frequency carrier signal amplitude modulated by a video signal. Moreover, because the carrier signal oscillator stage 166 and the attenuator filter 200 are tunable to a plurality of frequencies, the present modulator system simulates a plurality of two transmitter systems.

What is claimed is:

1. A modulator system comprising:

a source of video information signals, a source of radio frequency carrier signals tunable to a plurality of different frequencies, each frequency of said plurality of frequencies being selected to be within a different television channel to which a television receiver tuner may be tuned;

a modulator coupled to said source of radio frequency carrier signals and having an input terminal and an output terminal;

means connected between said source of video information signals and said modulator input terminal for coupling said video information signals to said modulator input terminal such that double sideband modulated radio frequency carrier signals are developed at said modulator output terminal;

a tunable attenuator filter coupled between said modulator output terminal and an other terminal, said filter tunable to a plurality of frequencies, each frequency of said plurality of frequencies having a fixed relationship to a corresponding frequency of said plurality of frequencies to which said source of radio frequency carrier signals is tunable; and control means coupled to said source of radio frequency carrier signals and said attenuator filter for controlling the tuning of both said source of radio frequency carrier signals and said attenuator filter such that the tuning of said attenuator filter tracks the tuning of said source of radio frequency carrier signals to develop vestigial sideband modulated radio frequency carrier signals at said other terminal.

2. A modulator system as defined in claim 1 wherein said modulator is a balanced amplitude modulator, and including a source of frequency modulated audio information signals coupled to said modulator input terminal, said frequency modulated audio information signals having a center frequency of 4.5 MHz.

3. A modulator system as defined in claim 1 wherein said tunable attenuator filter includes a parallel tuned circuit connected in series between said modulator output terminal and said other terminal.

4. A modulator system as defined in claim 3 wherein said attenuator filter includes a reactive element connected in series with a diode, said diode coupled to said control means and when biased for conduction connecting said reactive element in said attenuator filter tuned circuit to alter said tuned circuit resonant frequency.

5. In a video playback system of the type wherein television signals recorded on a record medium are detected and processed to provide signals for use in a television receiver having a tuner tunable to a plurality of television channels and coupled to an antenna terminal, a modulator system comprising:

a source of video information signals;

a source of radio frequency carrier signals tunable to a plurality of different frequencies, each frequency of said plurality of frequencies being selected to be within a different television channel to which a television receiver tuner may be tuned;

a modulator coupled to said source of radio frequency carrier signals and having an input terminal and an output terminal;

first means connected between said source of video information signals and said modulator input terminal for coupling said video information signals to said modulator input terminal such that double sideband modulated radio frequency carrier signals are developed at said modulator output terminal;

a tunable attenuator filter coupled between said modulator output terminal and an other terminal, said filter tunable to a plurality of frequencies, each frequency of said plurality of frequencies having a fixed relationship to a corresponding frequency of said plurality of frequencies to which said source of radio frequency carrier signals is tunable;

control means coupled to said source of radio frequency carrier signals and said attenuator filter for controlling the tuning of both said source of radio frequency carrier signals and said attenuator filter such that the tuning of said attenuator filter tracks the tuning of said source of radio frequency carrier signals to develop vestigial sideband modulated radio frequency carrier signals at said other terminal; and second means connected between said other terminal and said television receiver antenna terminal for coupling said vestigial sideband modulated audio frequency carrier signals to said antenna terminal for processing in said television receiver tuner.

6. A modulator system as defined in claim 5 wherein said modulator is a balanced amplitude modulator and including a source of frequency modulated audio information signals coupled to said modulator input terminal, said frequency modulated audio information signals having a center frequency of 4.5 MHz.

7. A modulator system as defined in claim 5 wherein said second means connected between said other terminal and said television receiver antenna terminal is a coaxial cable.

8. A modulator system as defined in claim 5 wherein said tunable attenuator filter includes a parallel tuned circuit connected in series between said modulator output terminal and said other terminal.

9. A modulator system as defined in claim 8 including a reactive element connected in series with a diode, and wherein said control means includes a switch coupled to said diode and operable to cause said diode to be biased into and out of conduction, said diode when biased into conduction connecting said reactive element in said attenuator filter tuned circuit to alter said tuned circuit resonant frequency, and said switch additionally connected in a resonant circuit associated with the tuning of said source of radio frequency carrier signals and operable to cause a change in the operating frequency of said source of radio frequency carrier signals.

* * * * *